G. J. MILLER.
HAY PRESS.
APPLICATION FILED DEC. 5, 1913.
1,118,946.
Patented Dec. 1, 1914.
10 SHEETS—SHEET 3.
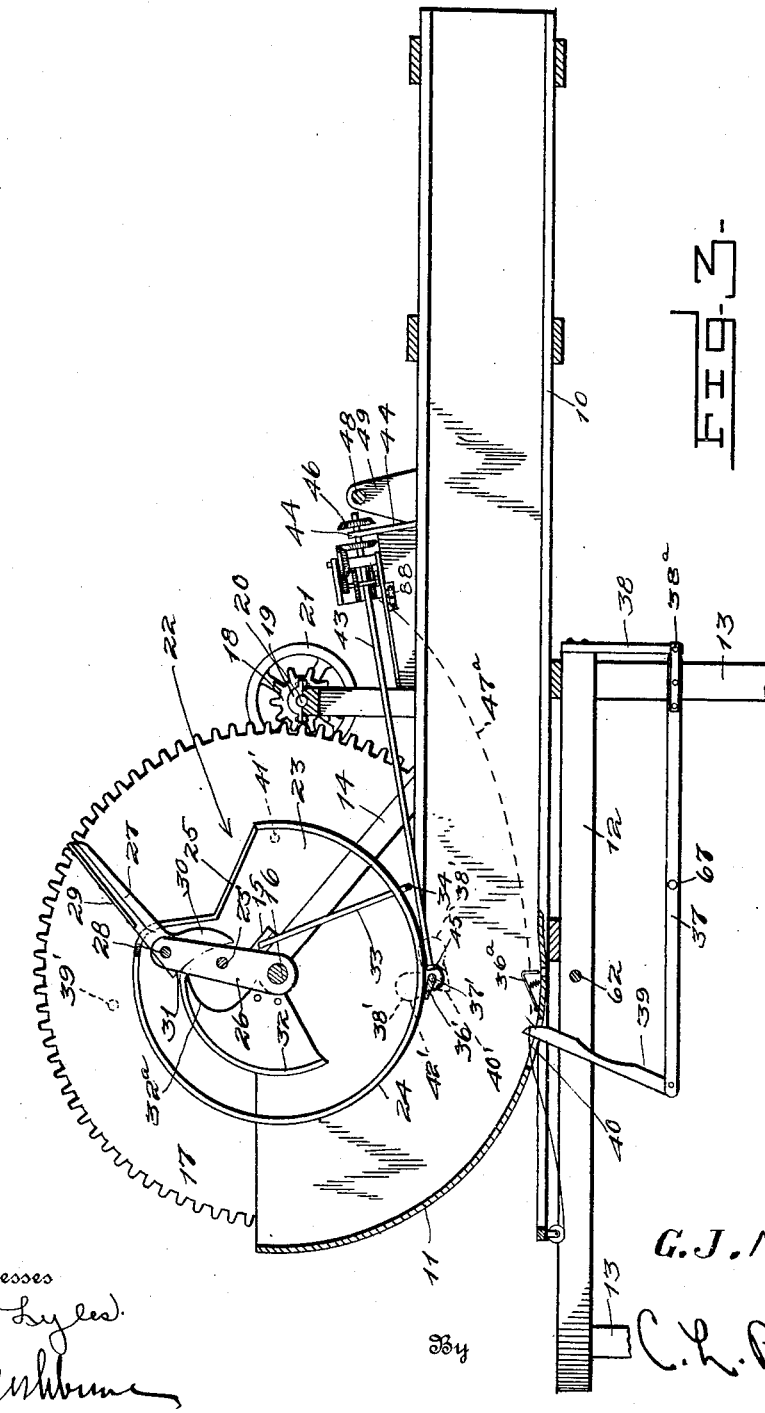
Witnesses
Inventor
G. J. Miller,
By
Attorney

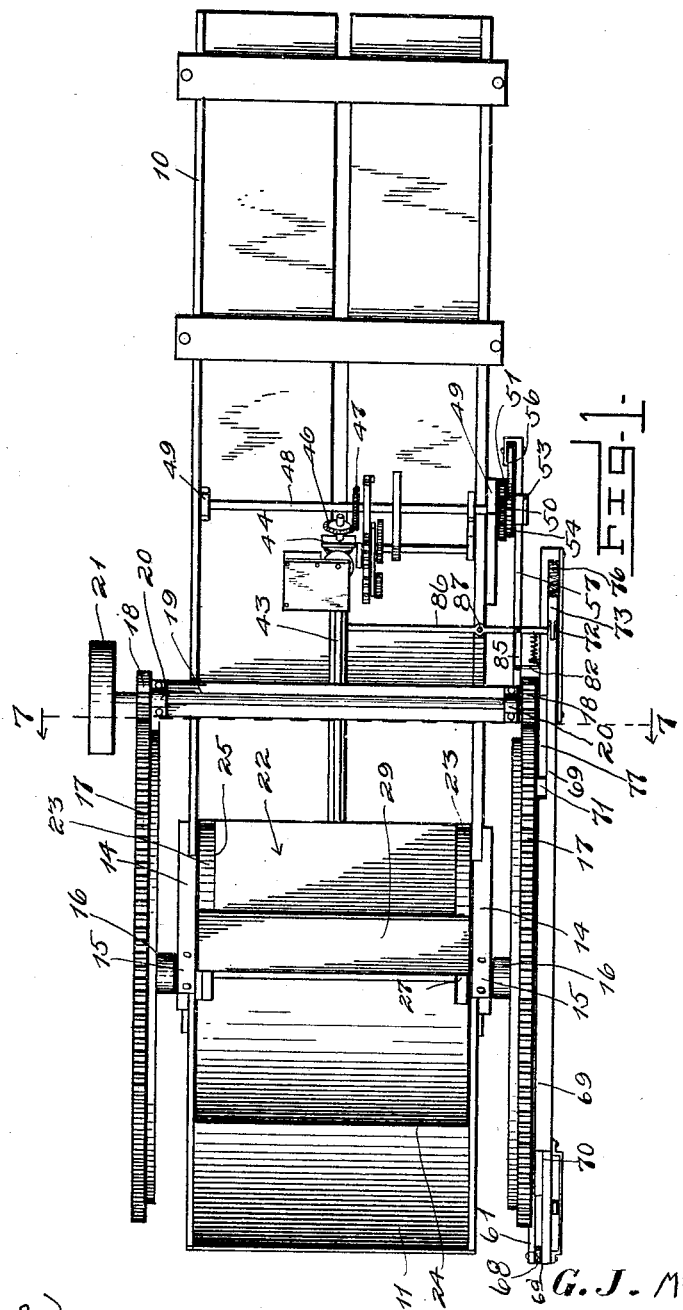

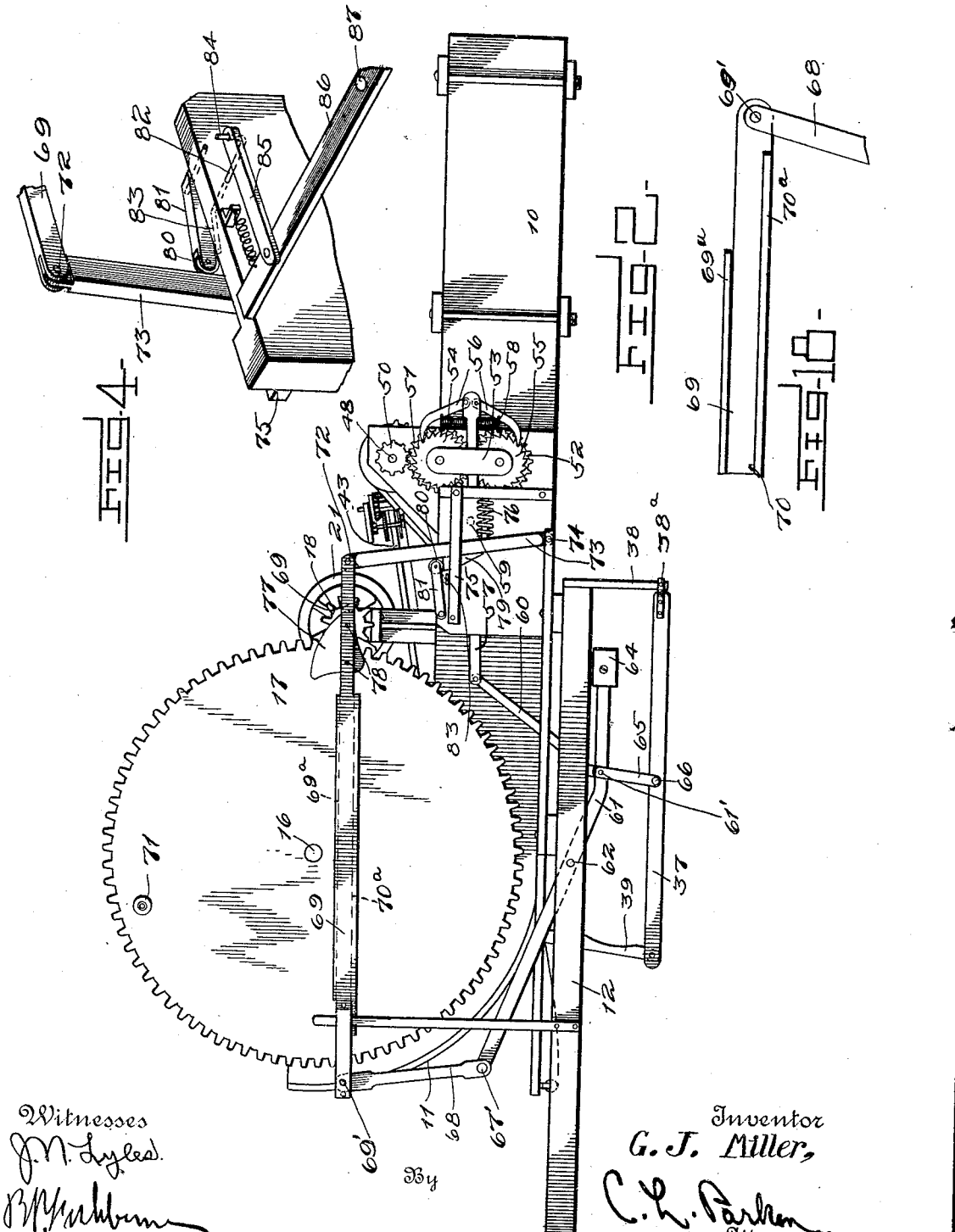

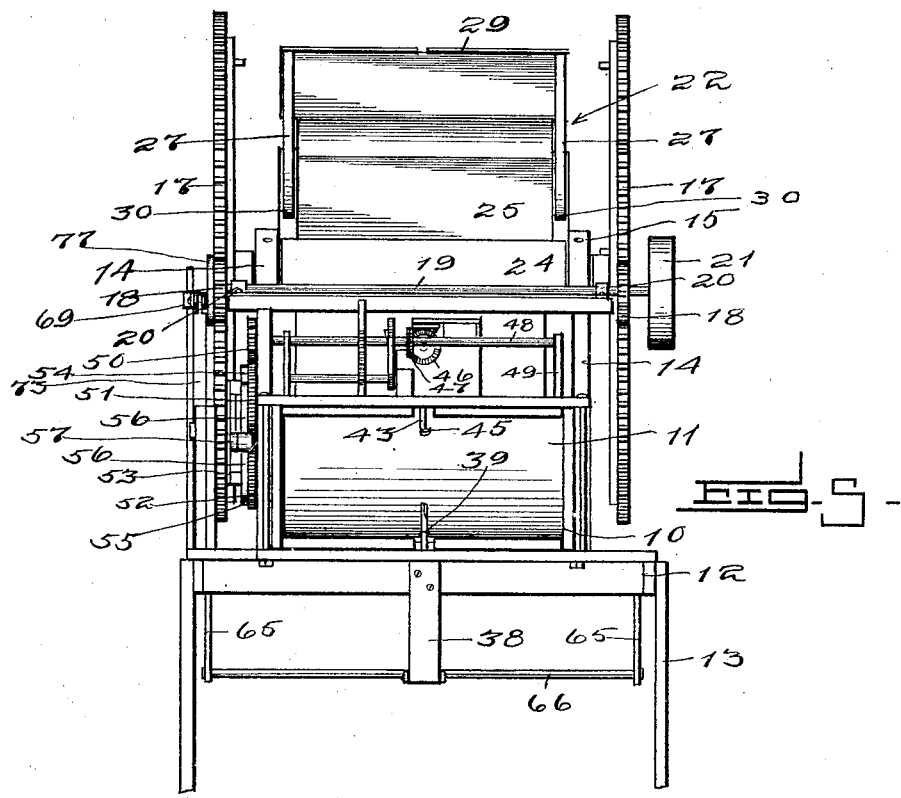
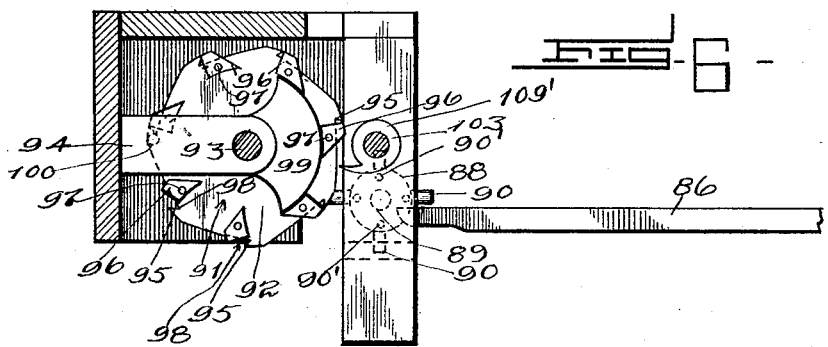

G. J. MILLER.
HAY PRESS.
APPLICATION FILED DEC. 5, 1913.
1,118,946.
Patented Dec. 1, 1914.
10 SHEETS—SHEET 5.
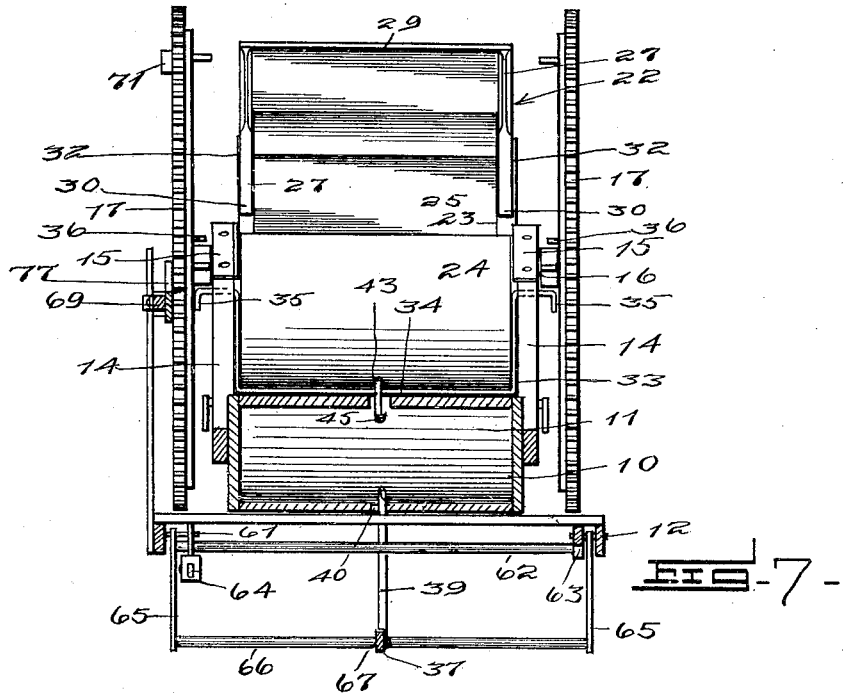
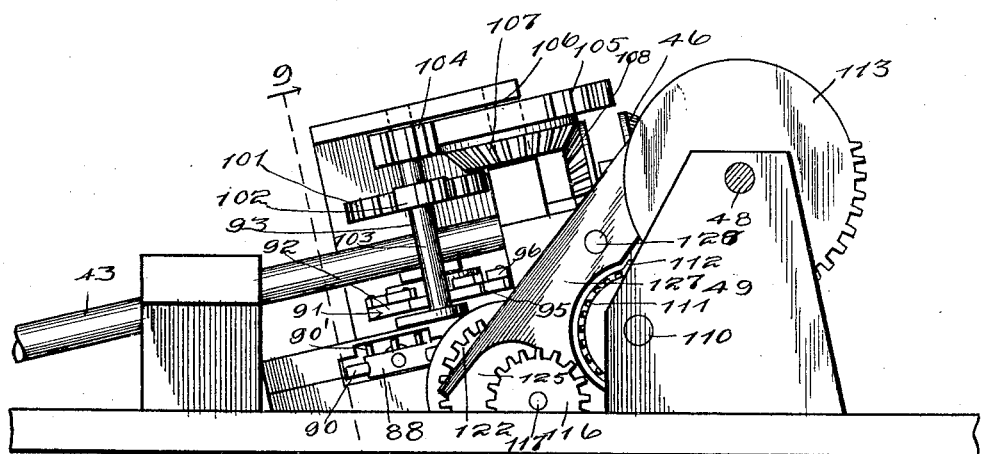

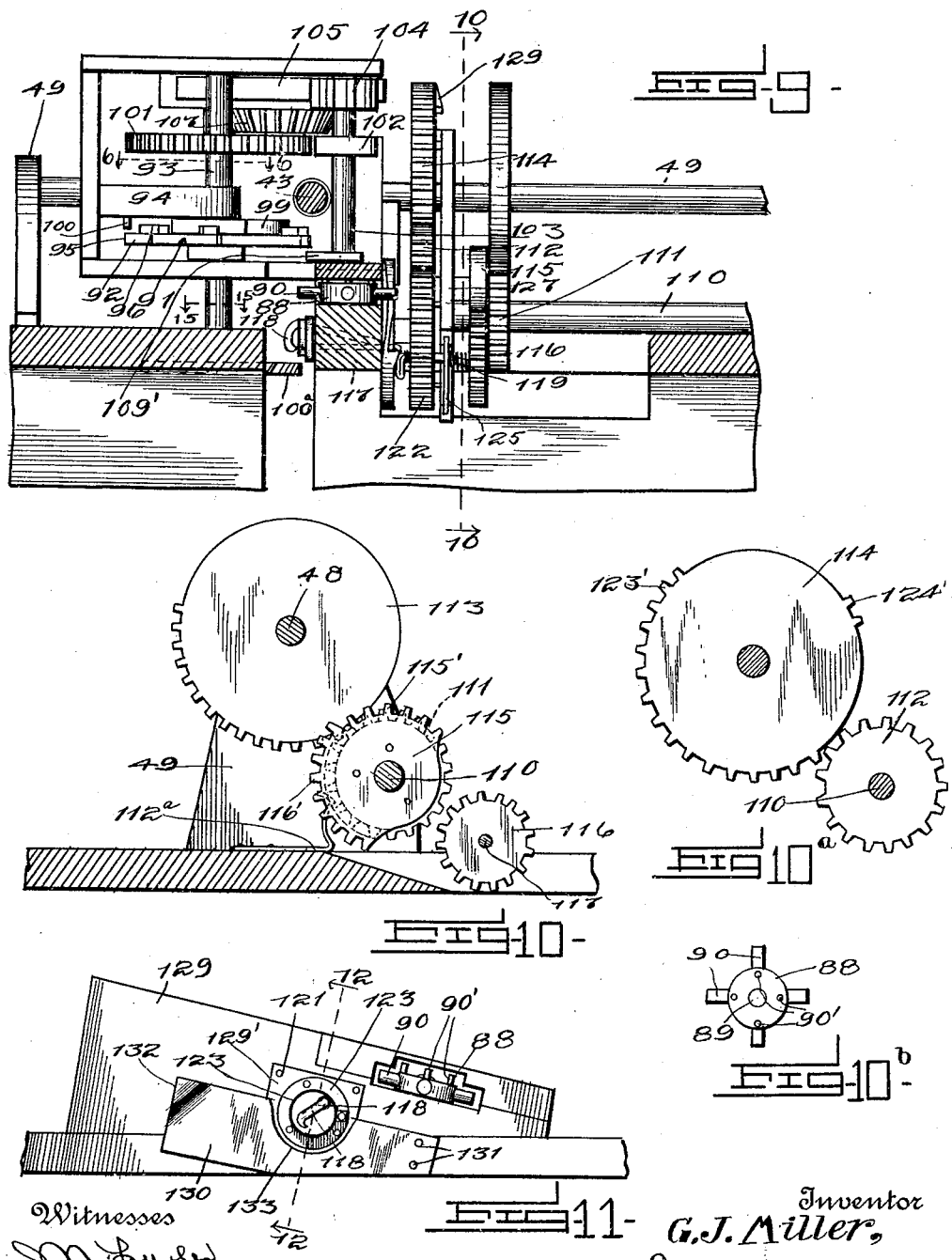

G. J. MILLER.
HAY PRESS.
APPLICATION FILED DEC. 5, 1913.
1,118,946.
Patented Dec. 1, 1914.
10 SHEETS—SHEET 7.
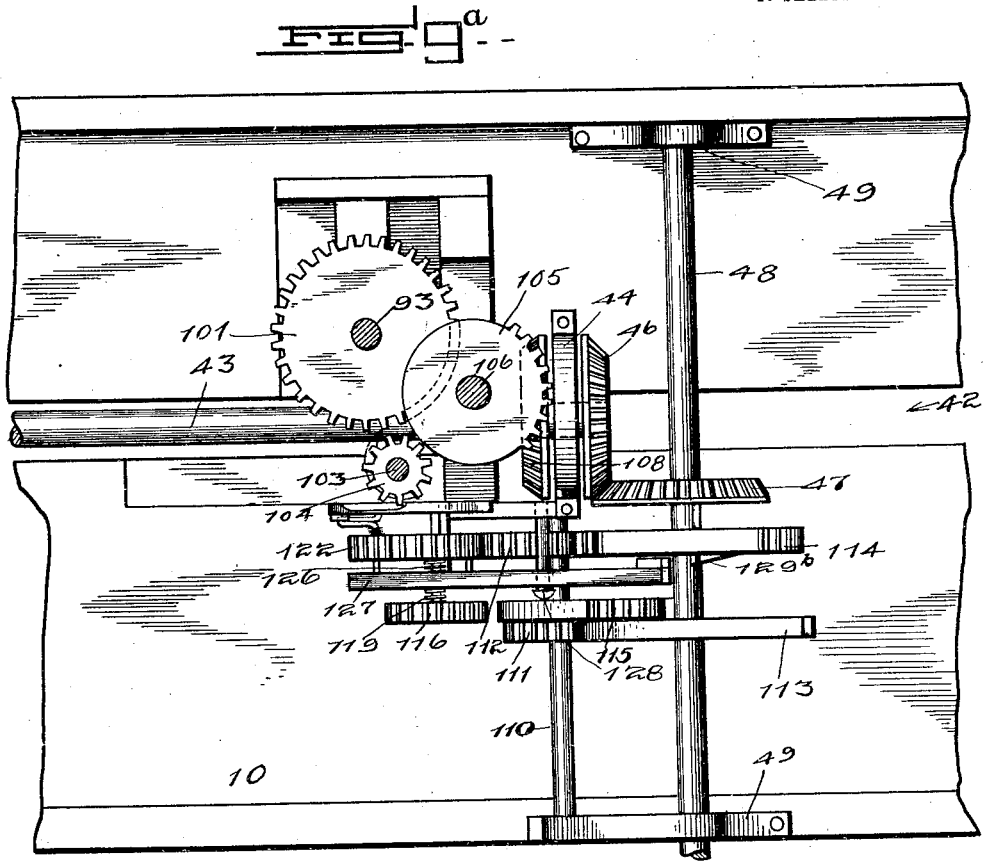
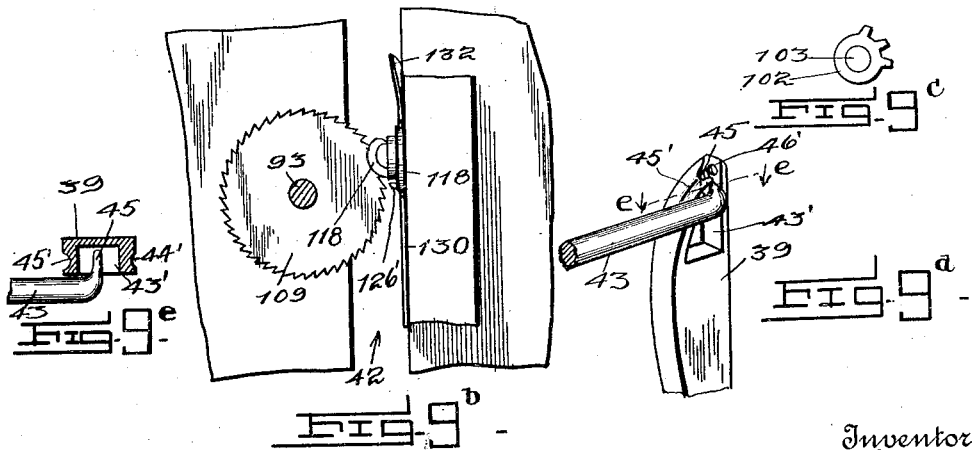

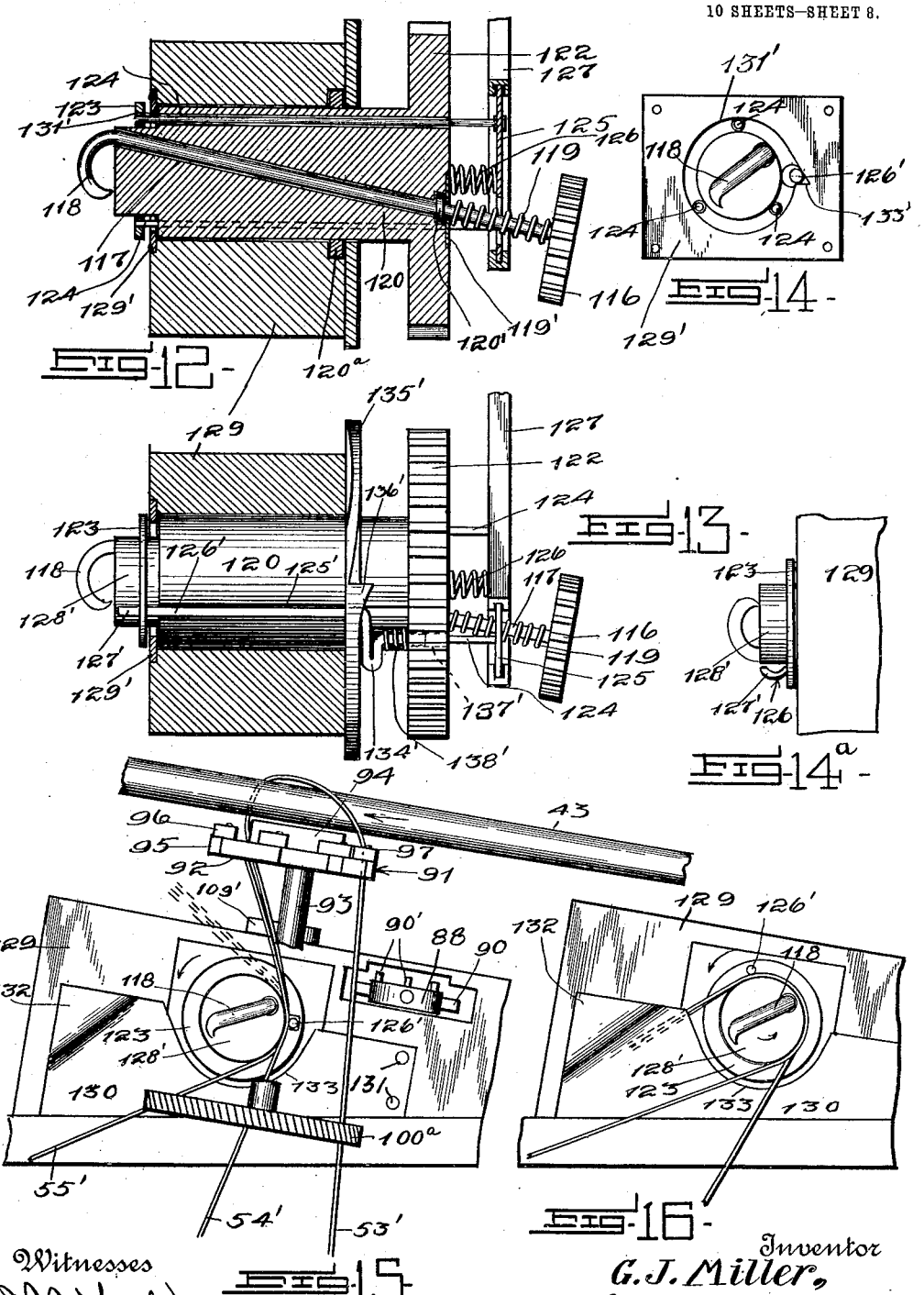

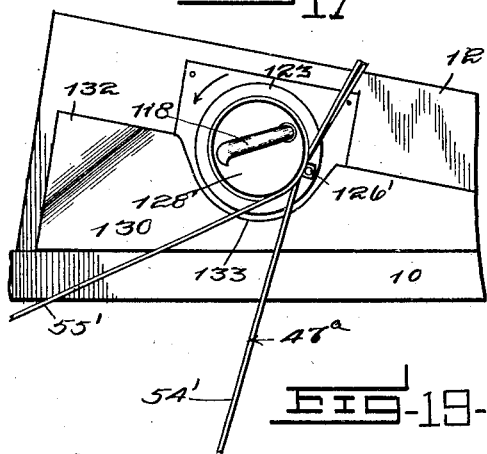
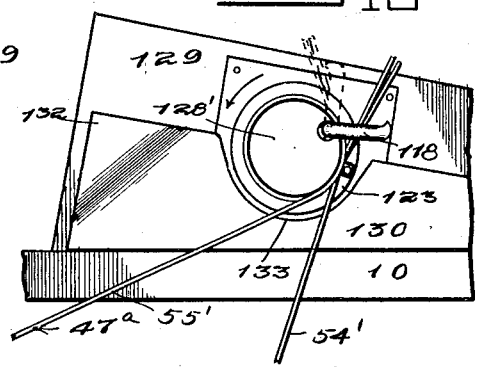
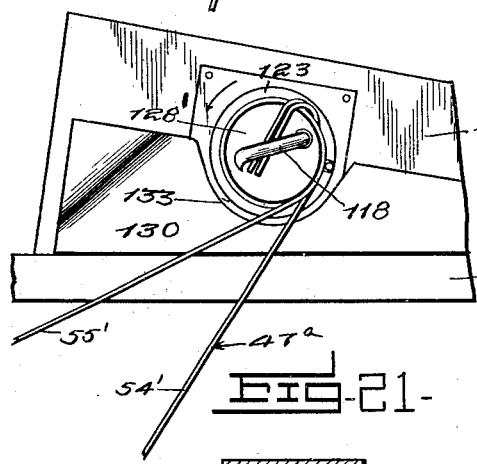
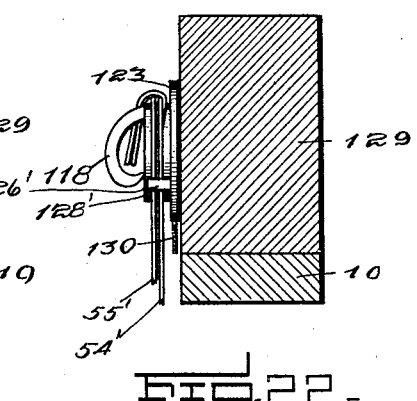
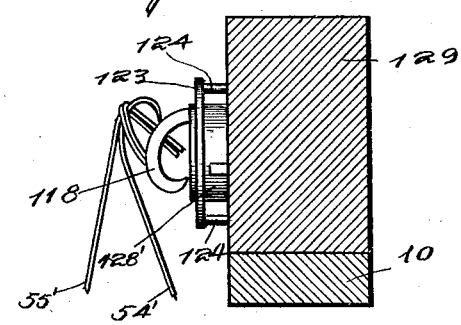
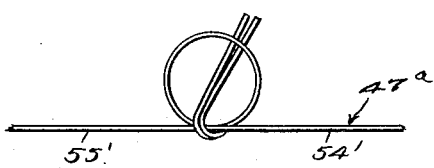

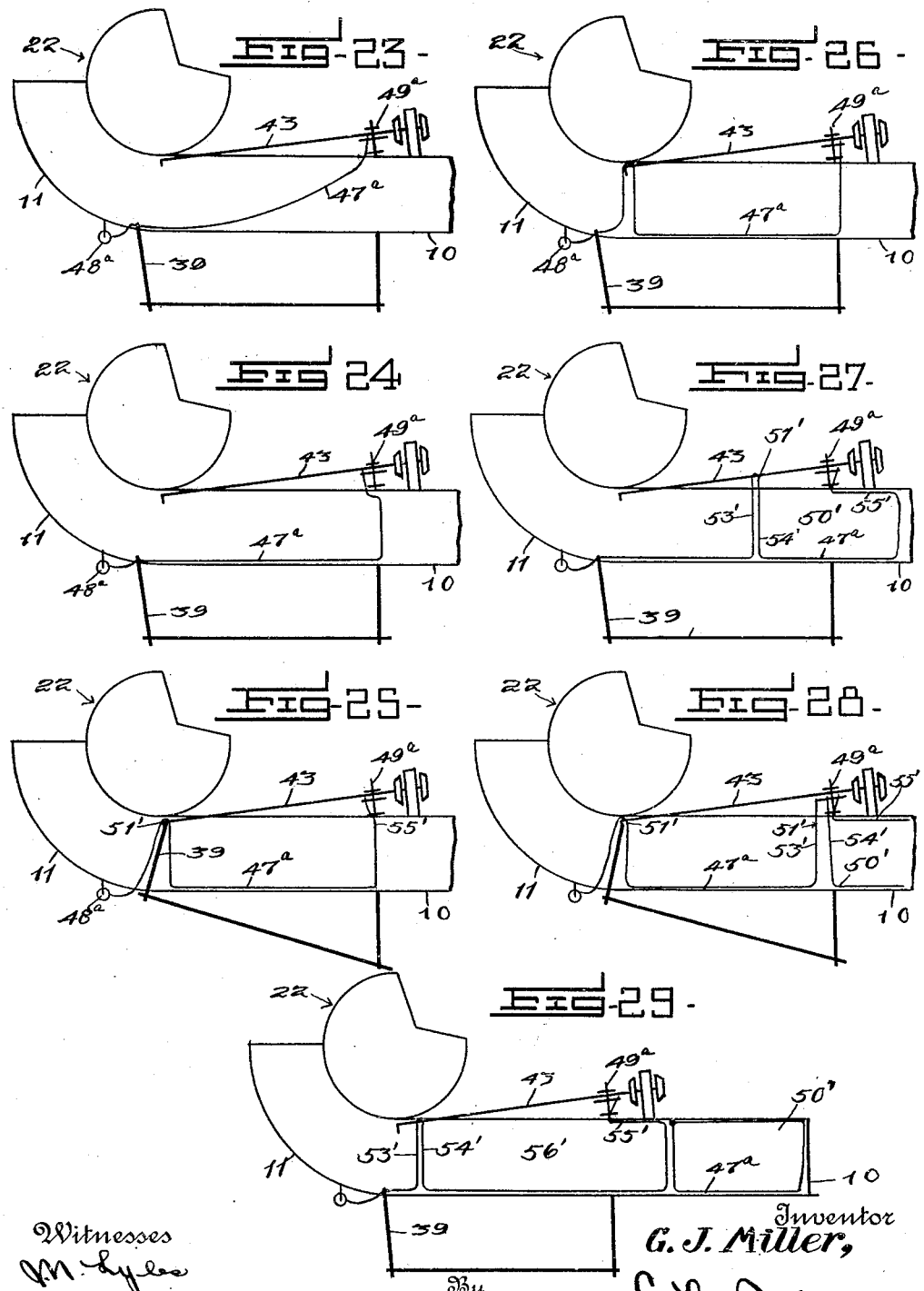

UNITED STATES PATENT OFFICE.

GEORGE J. MILLER, OF WILLOW HILL, ILLINOIS, ASSIGNOR OF ONE-HALF TO LEWIS W. MILLER, OF NEWTON, ILLINOIS.

HAY-PRESS.

1,118,946.  Specification of Letters Patent.  Patented Dec. 1, 1914.

Application filed December 5, 1913. Serial No. 804,880.

*To all whom it may concern:*

Be it known that I, GEORGE J. MILLER, a citizen of the United States, residing at Willow Hill, in the county of Jasper and State of Illinois, have invented certain new and useful Improvements in Hay-Presses, of which the following is a specification.

My invention relates to improvements in hay presses or the like.

The invention aims to provide means of the above mentioned character, by which the hay may be fed continuously, the same being pressed into bales, tied or wired, and discharged from the machine in a complete condition.

A further object of the invention is to provide means of the above mentioned character, which are automatic in operation, strong and durable.

Other objects and advantages of this invention will be apparent during the course of the following description.

In the accompanying drawings forming a part of this specification and in which like numerals are employed to designate like parts throughout the same, Figure 1 is a plan view of the hay press, Fig. 2 is a side view of the same, Fig. 3 is a longitudinal sectional view through the same, Fig. 4 is a perspective view of a pivoted upstanding post and associated elements, Fig. 5 is a rear end elevation of the entire apparatus, Fig. 6 is a horizontal sectional view taken on line 6—6 of Fig. 9, Fig. 7 is a transverse sectional view taken on line 7—7 of Fig. 1, Fig. 8 is a side elevation of gearing and associated elements, Fig. 9 is a vertical transverse sectional view taken on line 9—9 of Fig. 8, Fig. 10 is a similar view taken on line 10—10 of Fig. 9, looking in the direction of the arrows, Fig. 11 is an end elevation of the tying machanism, Fig. 10ª is a side elevation of a stripped gear, Fig. 10ᵇ is a plan view of a star wheel, Fig. 9ª is a plan view of gearing and associated elements, Fig. 9ᵇ is a plan view of tying mechanism, parts being removed, Fig. 9ᶜ is a plan view of a stripped pinion, Fig. 9ᵈ is a perspective view of the upper end of a needle, Fig. 9ᵉ is a horizontal section taken on line e—e of Fig. 9ᵈ, Fig. 12 is a central longitudinal sectional view through the tying mechanism, Fig. 13 is a side elevation of the same, Fig. 14 is an end elevation of the rotatable tying element, showing a plate to operate clamping means, Fig. 15 is an end elevation of the tying means, and associated elements, showing one step of the tying process, Fig. 16 is an end elevation of the tying means showing a second step in the tying process, Fig. 17 is a similar view showing the cut portions of the wire after they have been wound about the rotatable element and passed out above the guide plate, Fig. 18 is a similar view showing the cut ends as they are first engaged by the hook, Fig. 18ª is a fragmentary side elevation of a pitman, Fig. 19 is a similar view showing the position of the hook after it has completed its work, Fig. 20 is a side elevation of the same, Fig. 21 is a similar view showing the tied ends being removed from the rotatable element, Fig. 22 is an elevation of the tied ends of the wire, Fig. 23 is a diagrammatic view showing the manner in which the wire is held at one end of the bale, Fig. 24 is a similar view showing the position taken by the wire as the bale is being completed, Fig. 25 is a similar view showing the wire past about the opposite end of the bale and the needle in its elevated position, Fig. 26 is a similar view, the needle being moved to its lowered position, Fig. 27 is a similar view, showing the first bale being advanced toward the outlet end of the baling chamber while the second bale is being formed, Fig. 28 is a similar view showing the completing of the first bale, Fig. 29 is a similar view showing the first bale completed and the formation of the second bale, and, Fig. 14ª is a detail view of a wire clamping element.

In the drawings, wherein for the sake of illustration is shown a preferred embodiment of my invention, the numeral 10 designates a preferably horizontally arranged pressing or baling chamber, having its outer end open and its inner end provided with an upwardly curved intake chute 11, to receive the hay. The baling chamber 10 is supported by a frame 12, which is mounted upon legs 13 or any suitable foundation.

Attached to the opposite sides of the baling chamber 10 adjacent the curved intake chute 11, are upwardly extending inclined standards 14, to which are attached suitable bearings 15, receiving a transverse rotatable power distributing shaft 16. Rigidly mounted upon the opposite ends of the transverse shaft 16 are combined gear and fly wheels, 17, receiving their rotation from small gear wheels 18, which are rigidly mounted upon a transverse driving shaft 19. The transverse shaft 19 is journaled within fixed bearings 20 and carries a pulley 21, rigidly mounted thereon. This pulley is driven by a belt (not shown) which is driven by an engine or the like (not shown).

The numeral 22 designates a rotatable plunger as a whole, which is carried by the shaft 16 and disposed between the gear wheels 17, to operate within the curved intake chute 11. This rotatable plunger comprises curved ends 23, which are rigidly mounted upon the shaft 16 and are connected by a section of sheet metal 24, forming a drum. The ends 23 are provided with a cut-out portion 25, forming a recess, as shown. Disposed outwardly of and adjacent the ends 23 are cranks 26, rigidly attached to the shaft 16 and heads 23 by bolts 23'. Disposed outwardly of the cranks 26 and adjacent their outer ends are arms 27, pivoted thereto, as shown at 28. The arms 27 are connected by a transverse sweep 29. It is obvious that the sweep 29 may be swung inwardly within the recess 25 or may be swung outwardly to occupy a radial position. Each crank 27 is provided at its inner end with a cam 30, having a curved surface 31, to engage a stationary cam track 32. I prefer to construct the cams 30 sufficiently heavy, so that they will gravitate downwardly, to primarily engage the lower surface 32ᵃ of the cam tracks, whereby the sweep 29 will be positively swung outwardly, upon the rotation of the drum.

The numerals 33 (see Figs. 3 and 7), designates a U-shaped tripping bail, which is pivoted adjacent the bearing 15 and has its transverse portion 34 disposed exteriorly of the sheet metal drum 24. This tripping bale is pivoted above and eccentrically with relation to the shaft 16, whereby the sweep 29 may pass through the same, before the bale is swung upwardly, to engage the sweep, as will be explained. At its inner ends the U-shaped tripping bail or element 33 is provided with radially extending cranks 35, which are adapted to be engaged and tripped by pins 36 carried by the gear wheels 17. The function of this tripping bail or element is to primarily engage and swing the sweep 29 outwardly slightly, after the sweep has passed therethrough, if said sweep should fail to be so swung by the weight of the cams 30, whereby the free ends of the cams 30 will be sure to engage the lower surfaces 32ᵃ, and the sweep swung outwardly thereby, as above explained.

The numeral 36' designates a transverse folder-blade arranged within the lower end of the curved intake chute 11 exteriorly of and adjacent the rotatable drum. This folder-blade is rigidly attached to a transverse rock-shaft 37', to the outer ends of which are rigidly connected crank-weights 38', as shown. Connected with the gear wheels 17 are inwardly extending operating pins 39', adapted to engage one end portion 40' of the crank-weights 38' below the rock-shaft 37' to swing the folder-blade 36' downwardly.

The numeral 41' designates inwardly extending operating pins carried by the gear wheels 17 and arranged inwardly of the operating pin 39', to engage portions 42' of the crank-weights 38', when the folder-blade 36' has been thrown down, to return said folder-blade to its normal upper position in slidable engagement with the rotatable drum. The operating elements are so timed in their operation that the folder-blade 36' will be swung downwardly at about the same time or a little before the time that the sweep 29 moves into proximity thereto. The function of this folder-blade is to prevent the accumulation of hay or the like upon the drum, to prevent the hay or the like passing between the sweep and the drum, and to fold the straw downwardly to aid in its being properly fed or worked into the baling chamber and preventing a back movement of the hay or the like. The operating elements are so timed in their operation that the folder-blade 36' will be swung upwardly as soon as the free end of the sweep 29' clears it. Arranged below the folder-blade 36' are a suitable number of spring checks 36ᵃ, which serve to prevent the back feed of hay, without preventing the forward feed thereof.

Extending below and longitudinally of the baling chamber 10 (see Figs. 2 and 3) and adjacent the curved feed chute 11, is a vertically swinging lever 37, one end of which is pivotally connected with a depending bracket 38, as shown at 38ᵃ. Rigidly connected with the forward end of the lever 37 is a slightly inclined needle 39. As more clearly shown in Fig. 3, this needle is adapted to be passed through an opening 40, and be moved behind the rock-shaft 37' to one side of and near an element 45, to be described. As clearly shown in Fig. 9ᵈ the needle 39 is provided at its upper end and upon the side thereof adjacent the element 45 with a recess or chamber 43', the upper end of which is open. The opposite sides of the upper end of the needle are provided with grooves 44' and 45', the groove 45' extending to the upper end of the needle while the groove 44' has communication with an opening 46' to receive the wire, whereby the wire is permanently connected with the lever and is continuously fed therethrough during the operation of the machine.

Attention is now called more particularly to Figs. 3 and 9ᵈ, wherein the numeral 43 designates a looper rod, extending longitudinally of the baling chamber 10. This looper rod is arranged above the baling chamber and the forward end thereof passes into the baling chamber and terminates rearwardly of and near the folder-blade 36', as shown. This forward end of the loop or rod is bent to provide the laterally extending hook 45, adapted to be rotated into the recess or chamber 43' of the needle after the needle has been moved to its uppermost position. This laterally extending hook is then substantially horizontally arranged so that it will catch the wire upon the down stroke of the needle, the laterally extending hook being subsequently swung to a vertical position, whereby the wire which has been looped will slide upon the looper rod 43. When the looper rod is at rest the laterally extending hook is horizontally arranged but extends away from the needle.

The operation of passing the wire around each bale of hay as it is formed, will be clearly understood by referring to Figs. 23 to 29 inclusive, which illustrate diagrammatically the mode of operation. The numeral 47ª designates the wire, which is continuously fed from a spool 48ª. The rear end of this wire is connected with clamping means 49ª, to be described. The wire passes through the opening 46' of the needle, as above stated. Fig. 23 shows the operation of forming the first bale. When this bale is completed, the wire is passed about the looper rod 43, as illustrated in Figs. 25 and 26. Each completed bale 50' is moved longitudinally bodily through the baling chamber, as illustrated in Fig. 27, whereby the portion 51' of the wire passed over the looper rod slides longitudinally thereof toward the means 49ª, it being understood that the wire is continuously fed during the longitudinal movement of the bale. When the portion 51' of the wire, as shown in Fig. 28, is moved adjacent the means 49ª, one strand 53' is first engaged and held by the clamping means, subsequent to which the other strand 54' and the portion 55' are cut, the same being in engagement with each other, and subsequently to this cutting they are tied together, whereby the bale is completed. Fig. 29 shows the first bale 50' completed and about to be discharged from the baling chamber while a second bale 56' is being formed. It is thus seen that the bales are continuously formed.

One end of the looper rod 43 is journaled in a stationary bearing 44, as more clearly shown in Figs. 1, 3 and 9ª. The numeral 46 designates a bevel gear which is rigidly connected with the looper rod 43 and engaged by a bevel gear 47, which is rigidly mounted upon a transverse shaft 48 journaled through fixed bearings 49, as shown. Rigidly connected with the outer end of the transverse shaft 48 is a pinion 50 (see Figs. 1 and 2), engaged by a pinion 51. The pinion 51 engages a lower pinion 52, (see also Fig. 5), the pinions 51 and 52 being rotatably mounted within a bracket 53. Rigidly connected with the pinions 51 and 52 are ratchet wheels 54 and 55 respectively, which are engaged by pawls 56. These pawls are pivotally connected with the rear end of a vertically swinging lever 57 and are moved inwardly by a retractile coil spring 58, attached thereto. The lever 57 is pivoted between its ends, as shown at 59 in Fig. 2. Pivotally connected with the forward end of the lever 57 is a pitman 60, which is pivotally connected with a swinging lever 61, as shown at 61', said lever 61 being rigidly mounted upon a rock-shaft 62, as clearly shown in Figs. 2 and 7. A second lever 63 is rigidly mounted upon this rock-shaft. A weight 64 is adjustably mounted upon the free end of the lever 61. Pivotally connected with the levers 61 and 63, as more clearly shown in Figs. 2 and 7, are depending links 65, to the lower ends of which is attached a transverse rod 66, passing through an opening 67 formed through the longitudinally extending lever 37. It is thus seen that the swinging movement of the lever 61 will cause a swinging movement of lever 57, whereby the ratchet wheels 54 and 55 will be given a step by step movement, for a complete revolution.

Pivotally connected with the forward end of the vertically swinging lever 61, as shown at 67' is a link 68, (see Figs. 1 and 2), which link is pivotally connected to the forward end of a pitman 69, as shown at 69'. This pitman is provided upon its inner face (see Fig. 18), with a longitudinal groove or recess 70, to receive a roller 71, carried by the gear wheel 17. The pitman 69 has longitudinal flanges 69ª and 70ª, the flange 70ª extending forwardly beyond the flange 69ª, as shown in Fig. 18. The pitman 69 is pivoted, as shown at 72, with an upstanding post 73, which is pivoted at its lower end, as shown at 74. The post 73 operates within a guide bracket 75, the same being normally held in one position by a spring 76, as shown in Figs. 1 and 2. The pitman 69 is longitudinally movable and this movement is effected when the roller 71 enters the groove 69 of said pitman, said roller finally engaging a cam element 77, attached thereto as shown at 78, to reset the pitman 69 and associated elements, as will be apparent. The pitman 69 is also capable of being swung in a vertical plane, whereby the roller 71 will not bind when passing through the slot 70. At this point it is well to state that the roller 71 only enters the groove 70 at certain periods, to wit, when the pitman 69 is released and moves forwardly by the spring 76, whereby flange 70ª will be disposed in the path of travel of the roller 71. The pitman 69 and associated elements are shown as released, in Fig. 2. It is thus seen that the continuous rotation of the gear wheel 17 serves to periodically oscillate and longitudinally move the pitman 69, the oscillatory movement serving to move lever 37 and ratchet wheels 54 and 55, such ratchet wheels being turned sufficiently, whereby their combined movements, through the medium of pinions 51 and 52, will rotate pinion 50 for a complete revolution. In other words, each time the roller 71 operates the pitman 69, the pinion 50 is turned for a complete revolution.

As more clearly shown in Fig. 2, the pivoted post or lever 73 is provided with a cam or shoulder 79, adapted to be engaged by a wheel 80, (see also Fig. 4), carried by a pivoted arm 81. The post 73, is shown in Fig. 2 as being released and moved to its forward position whereby the roller 71 will engage the flange 70ª to operate the pitman 69, the arm 81 having been swung upwardly so that the roller 80 has cleared the cam or trip 79. During the operation of the machine, that is while the drum is being rotated and the hay being fed into the baling chamber, the pivoted post 73 is normally held in the rear position by the lever 81, until sufficient hay has been fed into the baling chamber to complete the bale being formed. It will thus be seen that while the lever 73 is in its rear position, the gear wheel 17 may be continuously rotated without the roller 71 engaging the flange 70ª, whereby the pitman 69 will not be oscillated. When, however, sufficient hay has been fed into the baling chamber, automatic means to be described are actuated, whereby the arm 81 is swung upwardly and the pivoted post 73 released. When this takes place the pitman 69 will be oscillated, the same being moved longitudinally to reset the pivoted post 73 by the roller 71 engaging the cam 77 attached thereto. Attention is called to the fact that the roller 71 each time that the same actuates the pitman 69, moves the forward end of the pitman downwardly and then upwardly to the normal horizontal position.

The automatic means, above referred to, to swing the lever 81 upwardly, comprises, as more clearly shown in Fig. 4, a horizontal rock-shaft 82, having its outer end provided with a crank 83, arranged below and in engagement with the lever 81, to swing the latter upwardly. At its inner end the rock-shaft 82 is provided with an upstanding crank 84, passed through an aperture in one end of a link 85, the opposite end of which link is pivoted to a transverse lever 86, pivoted between its ends, at 87.

As more clearly shown in Figs. 1, 4 and 6, the lever 86 has its inner end arranged adjacent a rotatable star wheel 88, which is rigidly mounted upon an axle 89. This rotatable star wheel has two sets of teeth 90 and 90′. The teeth 90′ are adapted to successively engage the free end of the lever 86, to swing the same whereby the lever 81 will be elevated, for the purpose above set forth. The star wheel 88 is periodically automatically advanced a step, when the wire which is looped over the looper rod 43 has moved rearwardly, to the position where it is clamped, cut and tied, as shown in Fig. 15. It is thus seen that as each bale is almost completed the post 73 will be automatically released, whereby the roller 71 will oscillate pitman 69, which supplies the power to the needle, clamping means, cutting means, and tying means.

Attention is now called to Figs. 6, 8, and 15, wherein the numeral 91 designates a detachable clamping or holding element, as a whole, such holding element or means comprises a rotatable disk 92 which is rigidly mounted upon a vertical rotatable shaft 93, journaled through bearings 94. The disk 91 is provided at its periphery with stationary teeth 95, and pivoted co-acting teeth 96, connected with said disk as shown at 97. As each tooth 96 travels near to the star wheel, the same is primarily open, providing a space 98 for the reception of a portion of the wire, as will be explained. Each tooth 96 is moved into slidable engagement with a stationary cam-track 99, whereby the tooth is swung outwardly and the wire within the recess 98 is securely clamped between the co-acting teeth 95 and 96, and remains thus clamped until the pivoted tooth clears the opposite end of the stationary cam-track 99. Each pivoted tooth 96 is successively swung to its inner position by a stationary stop or striker element 100.

The operation of the clamping means or element will be more clearly understood by referring to Figs. 15 and 29. The portion 55′ of the wire is now being held by the clamping means including the disk 92, which is now stationary. The portion 53′ of the wire is moved within one of the recesses 98, to be clamped to the plate or disk 92 upon its turning movement, and the portion 54′ moves into engagement with the star wheel to advance it a step, said portion 54′ being moved into engagement with the portion 55′, to be cut and tied therewith, to be explained. As the portion 53′ of the wire which is clamped by the holding means before the portion 55′ is cut, moves toward the plate or disk 92, it engages a retarding toothed-wheel 100ª, which is rigidly mounted upon the vertical shaft 93, such portion 53′ of the wire being held thereby in spaced relation from the star wheel and the tying means to be described.

The vertical shaft 93 is turned by a pinion 101 rigidly mounted thereon, as clearly shown in Figs. 8, 9, and 9ª. As clearly shown in Figs. 8, 9ª and 9ᵇ, the pinion 101 is engaged and driven by a stripped pinion 102, of much smaller diameter. The pinions 101 and 102 are to be so constructed that upon a complete revolution of the pinion 102 the pinion 101 will be advanced a step whereby the portion of wire 53' which has just moved into the recess 98 will be clamped, said pinions 101 and 102 then disengaging, subsequently to which the pinion 102 temporarily stops, as will be explained, said pinion 102 being again started to complete its revolution, the same effecting a further movement of the pinion 101, whereby said portion of wire will be advanced to occupy a position in proximity to cutting means to be described, whereby it will be cut by the cutting means the next time that it is operated. The stripped pinion 102 is rigidly mounted upon a vertical rotatable shaft 103, having a small pinion 104 rigidly connected therewith. The small pinion 104 is driven by a stripped pinion 105, which is rotatably mounted upon a vertical shaft 106. The pinions 104 and 105 are so constructed that upon a complete revolution of the pinion 105 the pinion 104 will be rotated a complete revolution, the pinion 105 first turning the pinion 104 for about one-half the revolution, stopping the same, and then rotating the pinion 104 for the other half of the revolution. The pinion 105 has a bevel gear 107 arranged therebelow and rigidly connected therewith, such bevel gear being driven by a bevel gear 108 of the same diameter. The bevel gear 108 is rigidly mounted upon the looper rod 43. This looper rod is rotated by the bevel gear 46, rigidly mounted thereon and being of the same diameter as the bevel gear 108. The bevel gear 46 is driven by the bevel gear 47, of the same diameter. The transverse shaft 48 is rotated for a complete revolution, when the post 73 is tripped, which occurs when sufficient hay has been fed into the baling chamber to complete the bale being formed.

Rigidly connected with the lower end of the vertical shaft 103 is a rotatable cutter 109', occupying a normal starting position as shown in Fig. 6. As above stated, the shaft 103 is first rotated one-half of a revolution, stopped, and then rotated for the other half of the revolution. Upon the turning of the shaft 103 for the first half of the revolution the cutter 109' will cut portions 54' and 55' of the wire, the same being subsequently tied together, as will be explained. Upon the turning of the shaft 103 for the second half of its complete revolution, the cutter 109 will be rotated or returned to its normal starting position.

The numeral 110, (see Figs. 9, 9ª, and 10) designates a relatively stationary horizontal transverse shaft, upon which are rotatably mounted independently of each other gears 111 and 112, which are driven respectively by stripped gears 113 and 114. Each of the gears or pinions 111 and 112 are engaged by a stationary suitably stiff spring 112ª, serving to prevent their accidental rotation, but allowing the same to be properly rotated, whereby the teeth of the pinions 111 and 112 will be properly engaged by the teeth of the stripped pinions, which drive them. The stripped gear 113 is adapted to rotate the gear 111 for a complete revolution while it is making one-half of a revolution, the gear 111 remaining stationary while the stripped gear 113 is rigidly mounted upon the shaft 48, and is turned for a revolution.

The numeral 115 designates a stripped stepped pinion, provided with inner and outer sets of teeth 115' and 116', which are concentric with relation to each other. The pinion 115 is rotatably mounted upon the shaft 110 and is rigidly connected with the pinion 111 for rotation therewith. The pinion 115 is adapted to operate a planetary pinion 116, in a manner to be more fully described. The planetary pinion 116 is more clearly shown in Figs. 8, 9ª, 10, 12, and 13, the same being rigidly connected with the outer end of a rotatable tying rod 117, having its opposite free end bent into the form of a hook 118, which is slightly spirally twisted. The hook 118 is disposed below and in alinement with the slot 42 slightly in the rear of the cutter 109'. As more clearly shown in Fig. 12, the tying rod 117 is provided at its outer end with a compressible coil spring 119, engaging an apertured plate 119', carried by a rotatable sleeve 120. The function of this spring 119 is to prevent the tying rod 117 from being improperly rotated. Disposed within an end recess arranged beneath the plate 119' is a collar 120', serving to positively prevent the tying rod 117 from moving longitudinally toward its hooked end. The numeral 120ª designates a ring, rigidly connected with sleeve 120, and serving to prevent its horizontal movement in both directions. As clearly shown in Fig. 12, the tying rod 117 extends diagonally through the rotatable sleeve 120.

The sleeve 120 is provided at its outer end, as more clearly shown in Fig. 12, with a pinion 122, rigidly connected therewith, and engaged by the pinion 112. The gear 112 is driven by the gear 114, more clearly shown in Fig. 10ª. The gear 114 is provided with two sets of gear teeth 123' and 124'. In operation, upon the complete rotation of the gear wheel 114 the set of teeth 123' first engage the teeth of the gear wheel 112, to rotate the gear wheel or pinion 112 for almost a complete revolution, said pinion 112 being stopped by the disengagement of the teeth 123' therefrom and again turned to complete the revolution when the teeth 124' engage therewith. As more clearly shown in Figs. 13, 15 and 16, the sleeve 120 is provided upon its periphery with a longitudinally extending groove 125', within which is mounted to reciprocate a clamping rod 126', the inner free end of which is slightly inwardly curved or hooked, as shown at 127'. The slightly hooked end 127' of the clamping rod 126' is adapted to move outwardly to overhang the reduced end or spool 128' of the sleeve 120.

As more clearly shown in Fig. 14, the numeral 129' designates a stationary plate, attached to a fixed support 129, through which the sleeve 120 is journaled. This plate is provided with a circular opening 131', sufficiently large to receive the reduced end 128' and the outer end 127' of the clamping rod, the wall of the opening 131' serving to bend the outer portion or hooked end 127' inwardly to clamp the portions of the wire to the reduced end 128', said hooked end 127' automatically springing or moving away from the reduced end 128' when the same is moved into a recess 133', formed in the plate 129'. The clamping rod 126' is bent near its outer end to provide a crank 134', to travel in engagement with a stationary cam plate 135', provided with a cam shoulder 136'. Outwardly of the crank shoulder 134', the outer end of the clamping rod 126' extends into an opening 137' formed in the pinion 122, such outer end being off-set outwardly with relation to the body portion of the rod 126', whereby said rod cannot turn upon its longitudinal axis with relation to the sleeve 120. The clamping rod 126' is forced longitudinally in one direction, when released by a suitably stiff compressible coil spring 138'. As each bale is being completed, the portions 54' and 55' are moved into engagement with the reduced end or spool 128', inwardly of and adjacent the outer hooked end 127' of the clamping rod 126', such clamping rod being now held to the right whereby the end 127' thereof will not be disposed in the path of travel of the portions of wire 54' and 55', as the same move into engagement with the reduced extension 128'. The clamping rod 126' is held to the right against the action of the spring 138' by the crank 134' engaging the cam shoulder 136'. The hook or end 127' is also arranged within the recess 133'. It is thus seen that when the sleeve 120 commences to turn, crank 134' will be tripped by a cam shoulder 136', while the end or hook 127' remains within the recess 133'. The spring 138' will automatically move the clamping rod 126' toward the portions of wire 54' and 55', whereby they will be contained within the hook or end 127', such hook or end being now slightly spaced from the reduced end 128', whereby it can pass over the portions of wire 54' and 55' without pushing them off of the reduced end or spool. Upon the further turning movement of the sleeve 120, the outer portion or hook 127' will be moved out of the recess 133' and slidably engage the wall of the circular opening 131', whereby said hooked end 127' is forced or bent inwardly for clamping the portions of wire 54' and 55' to the reduced end 128', holding them upon the same until said hook 127' again enters the recess 133'. Mounted to reciprocate upon the reduced end 128' of the sleeve 120 adjacent the hook end 118 is a removing ring 123, attached to the ends of reciprocatory rods 124 to be moved thereby. Rigidly connected with the opposite ends of these rods is a shifting disk 125, forced outwardly by a spring or springs 126. The shifting disk is rotatably mounted within the grooved forked end of a shifting lever 127, (see Fig. 9$^a$), pivoted between its ends, as shown at 128. The shifting lever 127 is swung in one direction by a trip cam 129$^b$, carried by the gear or pinion 114. The gear or pinion 114 thus automatically moves the shifting lever 127, to move the ring 126 longitudinally of the reduced end 128', whereby the tied portions of wire 54' and 55' are removed therefrom, as will be more fully explained, in connection with the explanation of the tying operation.

The numeral 130 (see Figs. 11, 15 and 16), designates a guide plate one end of which is connected with a stationary support, as shown at 131, while the opposite end is free from connection and is bent outwardly slightly, as shown at 132. There is a curved space 133 between the removing ring 123 and the plate 130, whereby the cut ends of the wire may be carried by the clamping hook 127' behind the guide plate 130.

In the tying operation, the portion 53' of the wire is moved into one of the recesses 98, while the portion 54' is moved into engagement with the star wheel 88, to advance the same a step, subsequently to which the portion of wire 54' engages with the portion of wire 55', the two being arranged upon the reduced end 128', of the sleeve 120, as clearly shown in Figs. 15 to 21 inclusive. Upon the movement of the star wheel, as above stated, the elements of the cutting and tying means are thrown into proper action. The clamping hook 127' will first move outwardly to hold the portions 54' and 55' upon the extension 128', the sleeve 120 being now rotated. The cutter 109' is also being rotated whereby it will cut the upper end of the portions 54' and 55', such cut ends remaining upon the extension 128' and being carried behind the guide plate 130, as illustrated in Fig. 16, the sleeve 120 continuing to rotate until said cut ends pass above the guide plate upon the opposite side of the reduced extension 128', as shown in Figs. 17 and 18.

The cut ends of portions 54′ and 55′ are now upon the inner side of the portions 54′ and 55′. The sleeve 120 now temporarily stops and the tying rod 117 begins to rotate, as shown in Fig. 18, whereby its hooked end 118 engages the cut ends of the portions of wire 54′ and 55′, carrying them outwardly across themselves and holding them upon the end of the extension, as shown in Fig. 19. The sleeve 120 again starts to rotate, after the hooked end 118 engages and holds the cut portions 54′ and 55′, as shown in Fig. 19, the sleeve and hook now turning together until the sleeve 120 returns to its normal starting position, at which time the hook end 127′ of the clamping rod 126′ will return into the recess 133′, to release the tied portions 54′ and 55′ of the wire. When the sleeve 120 stops for the second time, the removing ring 123 is moved outwardly upon the reduced extension 128′, as shown in Fig. 21, whereby the tied portions 54′ and 55′ of the wire are sufficiently started or loosened so that the pull upon the wire from the bale will completely remove such portions from the reduced extension 128′, in their tied condition. The tied ends of the wire are shown in Fig. 22, after they are removed from the tying means. By the time that the portions of wire 54′ and 55′, have been tied and removed, as above indicated, the clamping element 91 has sufficiently turned or rotated to bring the portion 53′ of the wire into engagement with the reduced extension 128′, the same occupying the position of the portion 55′, whereby the operation may be carried out repeatedly.

It is to be understood that the form of my invention herewith shown and described is to be taken as a preferred example of the same, and that various changes in the shape, size and arrangement of parts may be resorted to without departing from the spirit of the invention or the scope of the subjoined claims.

Having described my invention, I claim:—

1. In apparatus of the character described, the combination with a baling chamber, of a movable plunger to feed material into the baling chamber and compress the same therein, and means driven by the movable plunger to pass a wire about the bale embodying a wire actuated element which automatically throws the means into action.

2. In apparatus of the character described, the combination with baling mechanism, of means for passing wire about the bale, and means moved by the wire to actuate the wire passing means.

3. In apparatus of the character described, a baling chamber, a movable plunger therefor, a driving member to move the plunger and provided with an actuating element, a needle to be moved transversely through the baling chamber, means to actuate the needle and adapted to be engaged and driven by the actuating element when in the operative position, means to automatically move the actuating means to the operative position when released, means to temporarily lock the actuating means in the inoperative position, and wire operated means to actuate the lock means.

4. In apparatus of the character described, the combination with a baling chamber provided with intake means, of a rotatable member arranged near the same, a sweep pivoted to the rotatable member, a relatively stationary element to engage the inner portion of the sweep to swing the same outwardly, an approximately U-shaped bail through which the sweep is adapted to pass, means to swing the approximately U-shaped bail whereby the same will engage the sweep and move the same outwardly, and means to rotate the member.

5. In apparatus of the character described, the combination with a baling chamber, of means for compressing material being fed therein, a looper rod extending longitudinally of the baling chamber, and means for passing a portion of a section of wire extending in proximity to the bale being formed, over the looper rod.

6. In apparatus of the character described, the combination with a baling chamber, of means for compressing material being fed therein to form a bale, a looper rod extending longitudinally of the baling chamber and provided at one end with a hook, means to rotate the looper rod, and means to pass a portion of a section of wire extending longitudinally of the bale adjacent one end of the bale whereby the same may be engaged by the hook and placed upon the looper rod.

7. In apparatus of the character described, the combination with a baling chamber, of means for compressing material being fed therein to form a bale, a looper rod extending longitudinally of the baling chamber and provided near its forward end with a hook, means to rotate the looper rod, means for holding one end of a section of wire extending longitudinally of the bale, and means for passing a looped portion of the wire about the forward end of the bale so that the same will be engaged by the hook of the looper rod.

8. In apparatus of the character described, the combination with a baling chamber, of means for compressing material being fed therein to form a bale, a looper rod extending longitudinally of the baling chamber and provided with a lateral extension, means to rotate the looper rod, means for passing a looped portion of a section of wire extending longitudinally of the bale in proximity to the lateral extension of the looper rod whereby the same will be transferred to the looper rod to move longitudinally thereof, and means to tie opposite end portions of the section of wire.

9. In apparatus of the character described, the combination with a baling chamber, of means for compressing material being fed therein to form a bale, a looper rod extending longitudinally of the baling chamber and provided near one end with a lateral extension, means to rotate the looper rod, a needle adapted to receive wire to form a loop thereof, means to move the needle whereby the looped wire is moved into proximity to the lateral extension of the looper rod to be transferred thereto, and means for connecting opposite end portions of the wire when the same is passed about the bale.

10. In apparatus of the character described, the combination with a baling chamber, of a rod extending longitudinally thereof, clamping means connected with the baling chamber to hold one end of a section of wire to be passed longitudinally about the bale to be formed, and means for passing a portion of the wire transversely through the baling chamber and about the rod.

11. In apparatus of the character described, the combination with a baling chamber, of means for compressing material being fed therein to form a bale and feed the bale longitudinally through the baling chamber, means for holding one end portion of a section of wire passed longitudinally about the bale, and guide means having slidable engagement with a looped transverse portion of the wire whereby the wire may be continuously fed during the baling operation.

12. In apparatus of the character described, the combination with a baling chamber, of a pivoted lever arranged upon one side thereof, a needle for receiving wire connected with the pivoted lever, means to move the pivoted lever so that the needle is moved transversely through the baling chamber, and a rotatable looper rod provided with wire catching means, disposed upon the opposite side of the baling chamber and adapted to coöperate with the needle.

13. In apparatus of the character described, the combination with a baling chamber provided with inlet means, of a rotatable member mounted near the inlet means, a compressing element carried by the rotatable member to operate within the inlet means, a wheel connected with the rotatable member to drive the same, a pivoted element arranged near the wheel, an operating element carried by the wheel and adapted to engage the pivoted element to move the same, a pivoted lever, connecting means between the pivoted lever and pivoted element, and a needle carried by the pivoted lever.

14. In apparatus of the character described, the combination with a baling apparatus, of a rotatable member to drive the same, a swinging pitman, an element carried by the rotatable member to engage the pitman and move the same, a pivoted lever, connecting means between the lever and pitman, and a needle carried by the pivoted lever.

15. In apparatus of the character described, the combination with a baling apparatus, of a rotatable member to drive the same, a swinging pitman provided with a longitudinal slot, an operating element carried by the rotatable member and adapted to enter the slot, a pivoted lever having connection with the swinging pitman, and a needle carried by the pivoted lever.

16. In apparatus of the character described, the combination with a rotatable member, of a pivoted grooved pitman arranged near the same, an element carried by the rotatable member and adapted to enter the groove thereof when the pitman is shifted to a certain position, means to shift the pitman, and wire engaging means connected with the pitman.

17. In apparatus of the character described, the combination with a baling chamber, of means for feeding hay into the intake end of the baling chamber, clamping mechanism arranged near the discharge end of the baling chamber for holding one end of a wire to be passed longitudinally about the bale, a rod extending longitudinally of the baling chamber, means to form a loop of a portion of the wire and pass such loop portion about one end of the bale and onto the rod, means to operate the clamping mechanism whereby the same will engage a portion of the loop of wire to hold the same, means to cut the other portion of the loop and the end of the wire being held by the clamping mechanism, and means to tie these cut ends together.

18. In apparatus of the character described, the combination with a baling chamber, of means to compress material being fed therein, a rod extending longitudinally of the baling chamber, means for holding one end of a wire to be passed longitudinally about the bale, means for placing a portion of the wire upon the rod so that the same may travel longitudinally thereof, means to cut and tie portions of the wire, driving means for the cutting and tying means, and means actuated by engagement with the wire moving longitudinally of the rod to throw the driving means into action.

19. In apparatus of the character described, the combination with baling mechanism, of means for effecting the longitudinal movement of the bale through the baling mechanism, means for holding one end of a wire to be passed longitudinally about the bale and to move longitudinally therewith whereby the end portions of the wire are moved into proximity to each other, means to tie the adjacent portions of the wire, driving means for the tying means, and means actuated by the movement of a portion of the wire to throw the driving means into action.

20. In apparatus of the character described, a baling chamber, a rotary plunger therefor, a rotary wheel to drive the plunger and provided with an actuating element, a longitudinally and laterally movable pitman adapted to be longitudinally shifted to assume hit and miss positions with respect to the actuating element, a needle to be moved transversely through the baling chamber, operative connecting means between the pitman and needle to move the needle upon the lateral movement of the pitman, and means to longitudinally shift the pitman.

21. In apparatus of the character described, a baling chamber, a rotary plunger therefor, a rotary wheel to drive the plunger and provided with an actuating element, a longitudinally and laterally movable pitman provided with spaced longitudinal flanges to receive the actuating element therebetween, a needle to pass wire transversely through the baling chamber and having operative connection with the pitman to be moved thereby, and means to effect the longitudinal movement of the pitman.

22. In apparatus of the character described, a baling chamber, means to compress material therein, a movable spring pressed lever, latch means to normally hold the lever against movement by the spring, wire operated means to operate the latch, means to cause the same to release the spring pressed lever, and means thrown into action by the movement of the lever and adapted to pass wire about the bale being formed.

23. In apparatus of the character described, a baling chamber, means to compress material therein, a movable spring pressed lever, a movable element to normally hold the lever against movement by the spring, a rock-shaft provided with a crank to engage and move said movable element, a pivoted lever connected with the rock-shaft to turn the same and having one end adapted to be engaged and moved by wire passed about the bale being formed, and means thrown into action by the movement of the lever in one direction and adapted to pass the wire about the bale.

24. In apparatus of the character described, a baling chamber, a rotatable plunger therefor, a rotatable wheel to drive the plunger provided with an actuating element, a pivoted member arranged near the wheel and adapted to be engaged by the actuating element, and a needle adapted to be moved transversely through the bailing chamber and having an operative connection with the pivoted chamber.

25. In apparatus of the character described, a baling chamber, a movable plunger therefor, and a rod arranged exteriorly of the baling chamber and extending longitudinally thereof and adapted to slidably engage with wire passed about the bale being formed.

26. In apparatus of the character described, a baling chamber, a movable plunger therefor, and rotatable wire guide means extending longitudinally of the baling chamber and having wire catching means, substantially as described.

27. In apparatus of the character described, a baling chamber, a movable plunger therefor, a wire guide rod extending longitudinally of the baling chamber, wire holding means arranged near one end of the wire guide rod, tying means arranged near the wire holding means, and means to pass a portion of the wire transversely through the baling chamber into engagement with the wire guide rod.

28. In apparatus of the character described, a baling chamber, a movable plunger therefor, a wire guide rod extending longitudinally of the baling chamber, wire holding means arranged near the wire guide rod, tying means arranged in coöperative relation to the wire holding means, wire cutting means arranged in coöperative relation with the tying means, and means to pass a portion of the wire transversely through the baling chamber and about the wire guide rod.

In testimony whereof I affix my signature in presence of two witnesses.

GEORGE J. MILLER.

Witnesses:
C. L. PARKER,
GERTRUDE M. STUCKER.

Copies of this patent may be obtained for five cents each, by addressing the "Commissioner of Patents, Washington, D. C."